Patented Jan. 10, 1950

2,493,777

UNITED STATES PATENT OFFICE 2,493,777

HYDROLYSIS OF CASEIN

James A. Reyniers, Niles, Mich., assignor to Amino Acids, Inc., Wilmington, Del., a corporation of Delaware No Drawing. Application August 27, 1947, Serial No. 770,944

2 Claims. (Cl. 99—20)

This invention relates to the art of food supplements and is a continuation in part of my abandoned co-pending application, Serial No. 536,438, filed May 19, 1944. As in said co-pending application it is an object of this invention to provide a readily assimilable highly nutritive protein food product or food supplement and especially one derived from casein.

More particularly it is an object of this invention to provide a food product or supplement which consists of a casein hydrolysate lying in a relatively narrow range or band in the degradation scale between casein and free amino acids and specifically between peptones and free amino acids.

Another object of this invention is to provide an expedient process of producing the food product or supplement described from skim milk.

With the above and other objects in view, which will appear as the description proceeds, this invention resides in the novel process and product set forth herein and more fully defined by the appended claims, it being understood that such changes may be made therein as come within the scope of the claims.

Though the work done and observations made so far were carried on with animals, specifically rats, it is believed that the product obtained through the practice of this invention will be entirely satisfactory and definitely beneficial to humans.

Until recently it was believed that a mixture of the essential amino acids, i. e., free amino acids, would suffice for the protein requirements of animals. This belief has been disproved. Such mixtures of essential free amino acids do not possess the nutritional value of protein hydrolysates. R. Elman and C. E. Lischer in the Journal of the American Medical Association 121: 498, 1943 show the superiority of protein hydrolysates over mixtures of essential amino acids as a diet for dogs. C. D. Bauer and C. P. Berg, in Jour. Nutr., 26: 51, 1943 show it to be true for mice; and A. A. Albanese and V. Irby, in Science, 98: 286, 1943 describe similar findings for rats. In each of these cases, however, the hydrolysate involved was completely hydrolysed to free amino acids.

Working with Caesarean born rats, which provide a more delicate measure of nutritional requirements than weaned animals, and using casein as the protein source material, I have found that a partial hydrolysate is far superior to complete hydrolysates in which the protein has been degraded to the free amino acids or the untreated casein. In fact the optimum nutritional benefit cannot be derived from the protein source material unless it is hydrolysed to a fairly well defined range down the degradation scale between the original protein source material and free amino acids.

In a specific test with Caesarean born rats, all those fed a theoretically complete diet based on cow's milk fortified with casein died, but those fed the same basic diet plus five percent (5%) of the product of this invention in liquid form remained alive and showed a substantially normal growth curve for new born white rats.

The product of this invention in its dry form is a highly hygroscopic water soluble white powder. It may be packaged in this form or dissolved in water for distribution as a liquid. It has a very pleasing aroma and is readily assimilable when fed orally. Beyond this it is difficult to describe the product other than by the way in which it is produced. It is an acid hydrolysate of casein obtained by hydrolysing casein to a point short of total degradation; more specifically the product lies essentially in the narrow range between peptones and free amino acids.

One specific example of the method employed in the production of the product of this invention is as follows:

1. Two quarts of skim milk is diluted with six quarts of water.

2. The casein is precipitated from this mixture in accordance with the following procedure: 29 c. c. of a diluted solution of $H_2SO_4$ (made up of 4 c. c. conc. acid sp. gr. 1.84 and 25 c. c. of water) is slowly added to the water-skim milk mixture with constant stirring and with the temperature of the solutions less than 20° C. and preferably at about 10° C.

The temperature at which the precipitation is conducted is important. It has ben found that if the precipitation is carried on at temperatures higher than 20° C., a tough grainy curd is formed which settles down with the objectionable consequence of occluding milk sugars and salts. On the other hand when precipitation is conducted at the temperature stated a smooth fine textured flocculent precipitate is produced. This precipitate has entirely different physical characteristics from those of the coarse grainy curds resulting from precipitation at high temperatures. In fact the dispersion is so fine when the precipitation is conducted at the reduced temperature that the precipitate formed can be observed only upon isolation of a small quantity of the mixture as for instance by spreading out a drop thereof.

3. The fine flocculent precipitate is separated from the whey in any suitable manner as for instance by filtration. If filtration is used a very fine filter cloth or paper is preferred.

4. The precipitate after being separated from the whey is suspended in 1600 c. c. of a water solution containing 20 c. c. of con. $H_2SO_4$ sp. gr. 1.84. With these proportions of water and acid the solution has a pH of slightly less than 1 (one).

While the stated concentration of acid has been found most suitable for practical results, as is well known to those skilled in the art, the concentration of acid of hydrolysis is not critical. Varying the strength of the concentration merely affects the time required for hydrolysis. The resulting solution is then hydrolysed by heating the same to 100° C. for twelve to twenty-four hours.

By virtue of the fact that the precipitate is in a fine flocculent state, it can be suspended in the water solution by simple stirring whereas the coarse curd which would result from precipitation at temperatures higher than that stated can be suspended in water only by violent mechanical trituration.

During the heating the acid acts upon the protein to produce degradation products by the well known process of hydrolysis. The fine flocculent state of the precipitate obtained by precipitation at less than 20° C. assures uniform action of the acid upon the protein with the result that the degradation of the mixture progresses substantially uniformly so that at any given time after heating commences most of the protein has been degraded to the same level in the degradation scale between proteins and free amino acids. The exact point at which degradation should be stopped, from the standpoint of obtaining the highest nutritional value, has not been definitely established but tests made conclusively show that hydrolysis should be stopped before total degradation and the consequent release of free amino acids has taken place.

Good results have been obtained when hydrolysis is stopped at the point when the solution, neutralized with sodium hydroxide, no longer forms a precipitate.

5. Toward the end of the heating period a sample is withdrawn and sodium hydroxide or any other suitable protein precipitating agent, as for instance trichloracetic acid, is added thereto in sufficient amount to effect precipitation. If a precipitate forms, heating may be continued and successive samplings taken until it is observed that no appreciable precipitate forms when the precipitating agent is added to the sample. Heating must not be carried beyond this point.

At this point the resultant degradation product lies substantially entirely in the narrow range between peptones and free amino acids. This range as is well known to those skilled in the art is well down the degradation scale which consists of the following steps: (a) casein; (b) proteoses; (c) peptones; (d) polypeptides; (e) free amino acids;

6. The partially hydrolyzed mixture is then cooled to approximately 10° C., and slaked lime is slowly added until a neutral solution is obtained. The slaked lime must be added slowly near the end of the reaction, otherwise partial decomposition of the protein degradation products occurs with the formation of undesirable by-products.

7. The calcium sulfate formed by the addition of the slaked lime is then filtered off.

8. Next the clear filtrate is evaporated to dryness under a vacuum.

9. The dry deposit of water soluble protein degradation product is removed, pulverized uniformly and packaged for use, or alternatively it is dissolved in water to any desired concentration, and then put up in suitable containers.

From the foregoing description, it will be apparent to those skilled in this art that this invention makes possible the production of a protein derivative food product or food supplement of superior quality and nutritional value, and that the method provided for its production lends itself to commercial application.

What I claim as my invention is:

1. The hereindescribed method of preparing a water soluble hydrolysate of casein which is readily assimilable and highly nutritive as a food product, which comprises: precipitating casein from skim milk by slow addition of acid to the skim milk; controlling the temperature of the skim milk solution during the precipitation of the casein so as to hold the same below 20° C. throughout the entire period of precipitation so that the resulting casein is a fine flocculent precipitate of homogeneous particle size; preparing an acidified aqueous solution of said fine flocculent casein containing sufficient acid for hydrolysis; heating said acidified solution until a hydrolysate is formed which lies substantially entirely in the narrow range in the degradation scale between peptones and free amino acids, but not beyond the point at which appreciable precipitation no longer occurs in a sample of the solution to which a protein precipitating agent has been added in sufficient amount to cause precipitation; neutralizing the hydrolysate; removing the salt of neutralization; and evaporating the remaining degradation product to essential dryness.

2. The hereindescribed method of preparing a water soluble hydrolysate of casein which is readily assimilable and highly nutritive as a food product, which comprises: precipitating casein from skim milk by slow addition of acid to the skim milk; controlling the skim milk solution during the precipitation of the casein so as to hold the same at about 10° C. throughout the entire period of precipitation so that the resulting casein is a fine flocculent precipitate of homogeneous particle size; preparing an acidified aqueous solution of said fine flocculent casein containing sufficient acid for hydrolysis; heating said acidified solution until most of the casein has been degraded into polypeptides but not beyond the point at which free amino acids begin to form in appreciable quantity; thereafter neutralizing the solution; removing the salt of neutralization; and evaporating the remaining degradation product to essential dryness.

JAMES A. REYNIERS.

REFERENCES CITED

The following references are of record in the file of this patent:

UNITED STATES PATENTS

| Number | Name | Date |
| --- | --- | --- |
| 2,180,636 | Kemmerer | Nov. 21, 1939 |
| 2,206,622 | Weizmann | July 2, 1940 |
| 2,338,415 | Downey | Jan. 4, 1944 |
| 2,364,008 | Stuart | Nov. 28, 1944 |

FOREIGN PATENTS

| Number | Country | Date |
| --- | --- | --- |
| 16,708 | Great Britain | 1900 |

OTHER REFERENCES

Whittier, U. S. Dept. Agr. Cir. No. 279, Aug. 1942, pages 13, 14 and 15.

Sutermeister et al., "Casein and Its Industrial Applications," 2nd ed., 1939 (copy in Division 6); Reinhold Pub. Corp., N. Y. C.; pages 24 and 25.